United States Patent
Saad

(10) Patent No.: US 6,721,558 B1
(45) Date of Patent: Apr. 13, 2004

(54) METHOD AND APPARATUS FOR DETERMINING THE CONFIGURATION OF HARDWARE INSTALLED ON REMOTE EQUIPMENT

(75) Inventor: Ron Saad, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/072,532

(22) Filed: May 4, 1998

(51) Int. Cl.$^7$ .................................................. H04B 1/00
(52) U.S. Cl. ........................... 455/424; 455/423; 701/35
(58) Field of Search ................................. 455/517, 507, 455/422, 423, 424, 425; 701/35

(56) References Cited

U.S. PATENT DOCUMENTS

| | | | | |
|---|---|---|---|---|
| 5,786,998 A | * | 7/1998 | Neeson et al. | 701/35 |
| 5,878,209 A | * | 3/1999 | Manssen | 340/311.1 |
| 5,929,848 A | * | 7/1999 | Albukerk et al. | 345/326 |

OTHER PUBLICATIONS

Paul McFedries, Windows 95 Unleashed, Professional Reference Edition, 327–29 (Sams Publishing 1997).

Windows NT Server, Plug and Play for Windows NT 5.0, White Paper, Microsoft Corp., downloaded from http://home.miningco.com (1997).

* cited by examiner

Primary Examiner—Thanh Cong Le
Assistant Examiner—Alan T. Gantt
(74) Attorney, Agent, or Firm—Ryan, Mason & Lewis LLP

(57) ABSTRACT

A technique is disclosed for automatically determining system configuration information, including the type and version of hardware installed on remote equipment. A modified central control station communicates with each remote cell station to perform an iterative system configuration process that progressively refines the system configuration information, until the actual installed system configuration is obtained, or until manual intervention is required. The system configuration process initially assumes a system configuration having the cell station fully installed with a default hardware component. The default "guess" is sent to the cell station which, in turn, communicates with each of the hardware components using a message protocol appropriate for the assumed configuration. In one embodiment, the cell station queries each of the hardware components for their associated type and version. The responses from the actual installed hardware components are collected by the cell station and returned to the central control station. The returned responses provide information that can be used by the central control station to ascertain the type and version of each hardware component actually installed. The assumed system configuration is refined over a number of iterations, until the system configuration is obtained, or until manual intervention is required.

18 Claims, 5 Drawing Sheets

RESPONSE ANALYSIS DATABASE

400

| | ASSUMED HARDWARE TYPE (425) | MESSAGE SENT (430) | RECEIVED RESPONSE (435) | POTENTIAL HARDWARE COMPONENT(S) (440) |
|---|---|---|---|---|
| 405 → | | | | |
| 410 → | TDMA RADIO | VERS. QUERY | NONE | ANALOG RADIO |
| 415 → | | | | |
| 420 → | | | | |

FIG. 4

METHOD AND APPARATUS FOR DETERMINING THE CONFIGURATION OF HARDWARE INSTALLED ON REMOTE EQUIPMENT

FIELD OF THE INVENTION

The present invention relates to a method and apparatus for updating system configuration information, and more particularly, to a method and apparatus for automatically determining information, such as type and version information, related to hardware installed on remote equipment, such as a cell station.

BACKGROUND OF THE INVENTION

FIG. 1 illustrates a conventional cellular telephone system 100. The cellular telephone system 100 includes a central control station 200 that interconnects the cellular telephone system 100 with any suitable telephone switching system, such as the Public Switched Telephone Network (PSTN) 120, and one or more cell stations 300. The cell stations 300 are generally remote from the central control station 200 and are typically placed throughout a cellular telephone service area. Telephone calls may be selectively placed by the central control station 200 between standard land line telephone subscribers of the PSTN 140 and a cellular telephone unit 130 or directly between two cellular telephone units 130, in a known manner. For a more detailed description of a suitable cellular telephone system 100, see, for example, U.S. Pat. No. 4,829,554, incorporated by reference herein.

The central control station 200 typically performs a number of conventional functions, including supervision and control; assigning telephone calls to the appropriate cell stations 300; and switching functions to interconnect callers. Each cell station 300 includes equipment to serve a plurality of cellular telephone units 130 simultaneously placing or receiving telephone calls. Thus, the cell stations 300 each include a plurality of transmitters and receivers (or transceivers). Likewise, each cellular telephone unit 130 includes a transmitter and a receiver (or a transceiver), tuned to the respective transmit and receive frequency of an assigned communication channel.

In order for a cell station 300 to perform required functions, the cell station 300 typically incorporates various pieces of hardware equipment. The same cell station 300, for example, might include a set of time division multiplex access (TDMA) transceivers and a set of code division multiplex access (CDMA) transceivers, each for communicating with different classes of cellular telephone units 130, and other hardware equipment, such as control and timing boards, in a known manner. In addition, the same cell station 300 might include a plurality of time division multiplex access (TDMA) transceivers, for example, each having a potentially different manufacturer, model number or version. Furthermore, in the event of a failure or when routine servicing is required, a given piece of hardware on a cell station 300 might be suddenly replaced by a compatible piece of hardware, having a different manufacturer, model number or version.

In order for the central control station 200 to properly communicate with and supervise each of the various remote cell stations 300 and its various included hardware components, however, the system configuration information stored by the central control station 200 must match the physical hardware elements that are actually installed on each cell station 300. Some systems for determining system configuration information, however, including type and version information of hardware installed on remote wireless equipment, are labor-intensive and require considerable manual effort. Specifically, an operator at the central control station 200 typically manually enters the type and version information for all hardware installed on a given remote cell station 300

As apparent from the above-described deficiencies with conventional techniques for obtaining system configuration information, a need exists for an automated technique for automatically determining system configuration information, including the type and version of hardware installed on remote equipment.

SUMMARY OF THE INVENTION

Generally, according to one aspect of the invention, a technique is disclosed for automatically determining system configuration information, including the type and version of hardware installed on remote equipment, such as a cell station. According to a further aspect of the present invention, a modified central control station communicates with each remote cell station to perform an iterative system configuration process that progressively refines the system configuration information, until the actual installed system configuration is obtained, or until manual intervention is required.

The system configuration process initially assumes a system configuration having the cell station fully installed with a default hardware component. The default "guess" configuration is sent to the cell station. A default message is then sent to the cell station which, in turn, queries each of the hardware components for their associated type and version. The cell station communicates with the installed hardware utilizing a conventional message protocol associated with the default hardware component. The responses from the actual installed hardware components are collected by the cell station and returned to the central control station. The returned responses provide information that can be used by the central control station to ascertain the type and version of each hardware component actually installed. The assumed system configuration is refined over a number of iterations, until the system configuration is obtained, or until manual intervention is required. In this manner, the system configuration process can obtain the system configuration over a number of iterations, with little, if any, manual involvement.

A more complete understanding of the present invention, as well as further features and advantages of the present invention, will be obtained by reference to the following detailed description and drawings.

BRIEF DESCRIPTION OF THE DRAWINGS

FIG. 4 illustrates a sample table from the response analysis database of FIG. 2.

DETAILED DESCRIPTION

Figure 1:
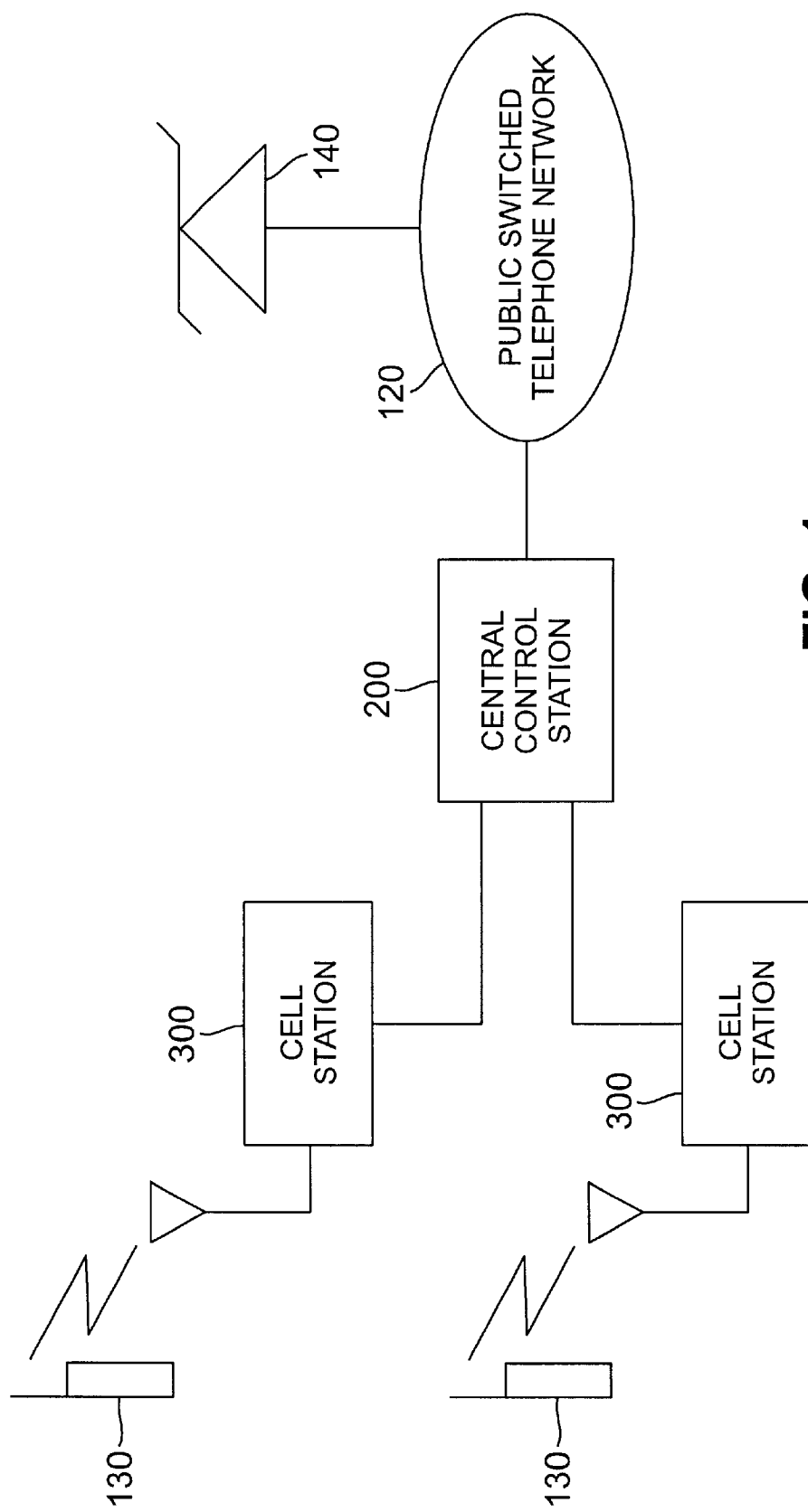
FIG. 1 illustrates a network environment for an illustrative conventional cellular system.

As previously indicated, FIG. 1 illustrates a conventional cellular telephone system 100. The cellular telephone system 100 includes a central control station 200 that interconnects the cellular telephone system 100 with any suitable telephone switching system, such as the Public Switched Telephone Network (PSTN) 120 and one or more cell stations 300. The cell stations 300 are generally remote from the central control station 200 and are typically placed throughout a cellular telephone service area.

Figure 5:
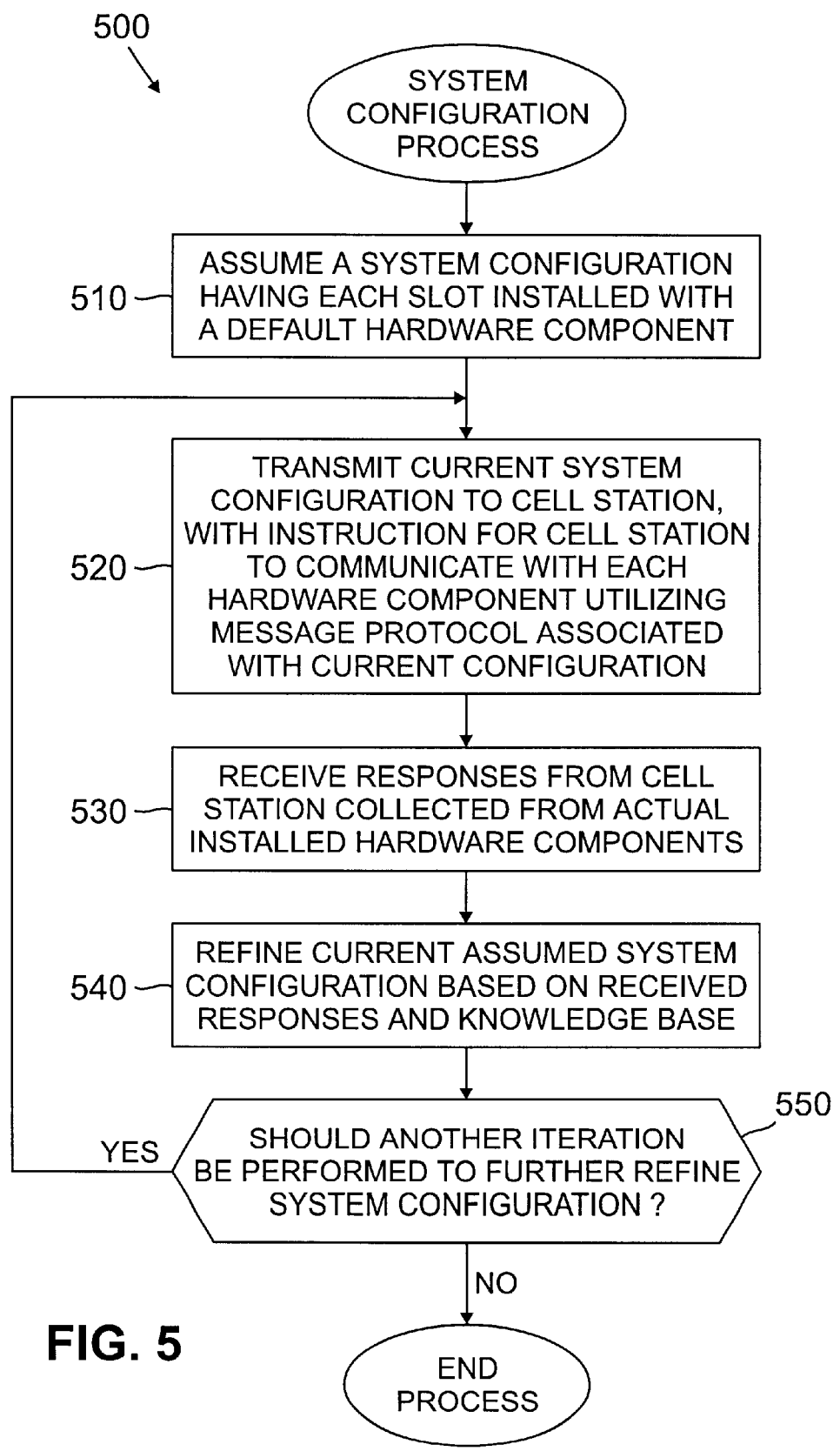
FIG. 5 is a flow chart describing an exemplary system configuration process performed by the central control station of FIG. 2.

According to a feature of the present invention, the central control station 200, discussed further below in conjunction with FIG. 2, communicates with each remote cell station 300, discussed further below in conjunction with FIG. 3, to perform an iterative system configuration process 500, discussed further below in conjunction with FIG. 5, that progressively refines the system configuration information, including the type and version of hardware component filling each slot 340A–340H (FIG. 3) on a given cell station 300.

Generally, the system configuration process 500 initially assumes a system configuration having each of the slots 340A–340H installed with a default hardware component. The cell station communicates with the installed hardware utilizing a conventional message protocol associated with the default hardware component. The default "guess" is sent to the cell station 300. The cell station 300, in turn, then communicates with each of the hardware components using a predefined message. In an illustrative embodiment, the cell station 300 queries each of the hardware components for their associated type and version. In an alternate embodiment, the cell station 300 transmits a diagnostic command or another command to each of the hardware components. The responses from the actual installed hardware components are collected by the cell station 300 and returned to the central control station 200. The returned responses provide information that can be used by the central control station 200 to help ascertain the type and version of the hardware component actually installed. For example, certain error responses may suggest an alternate guess for the installed hardware components. In addition, a failure to respond may indicate that a given slot has no hardware installed or may further suggest an alternate guess for the installed hardware components. Of course, if the expected response is received, the accuracy of the default guess for a given slot is confirmed. In this manner, the assumed system configuration is refined over a number of iterations, until the system configuration is obtained, or until manual intervention is required.

Figure 2:
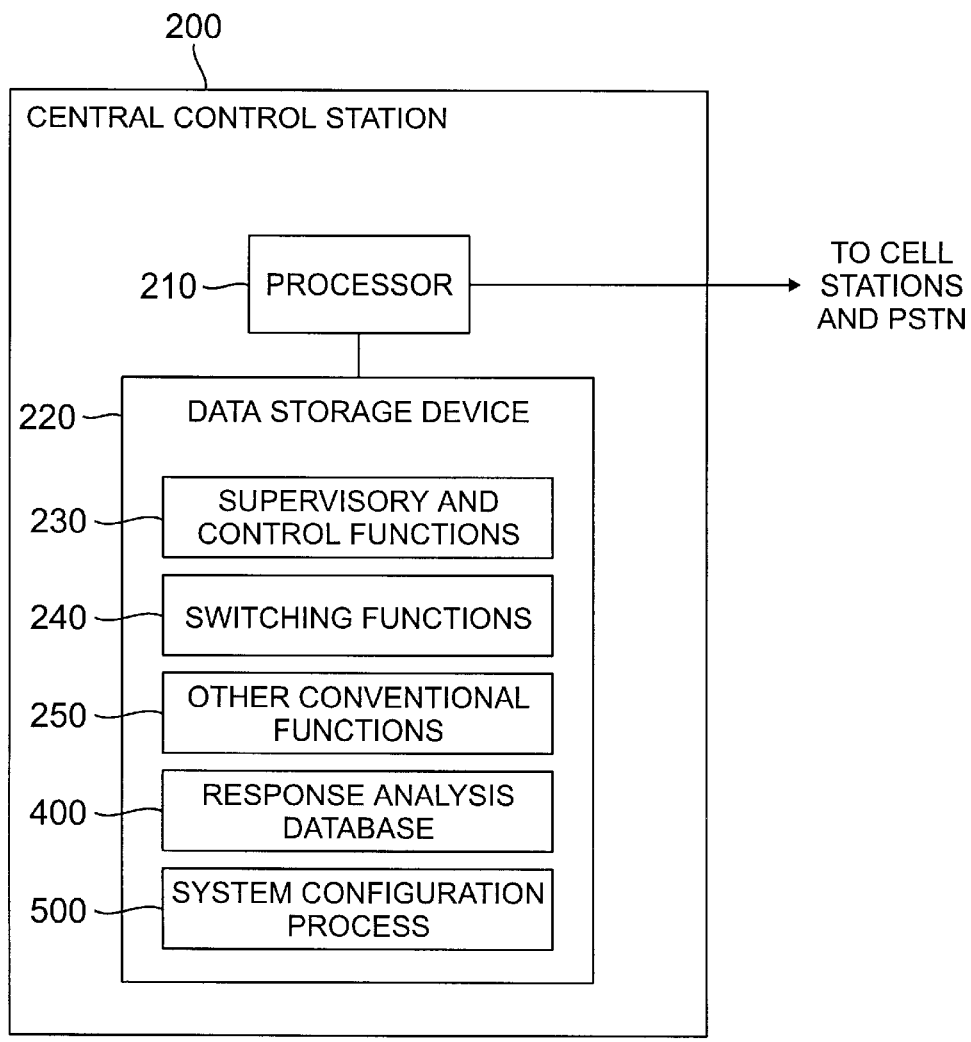
FIG. 2 is a schematic block diagram illustrating a central control station of FIG. 1, in accordance with the present invention.
Figure 3:
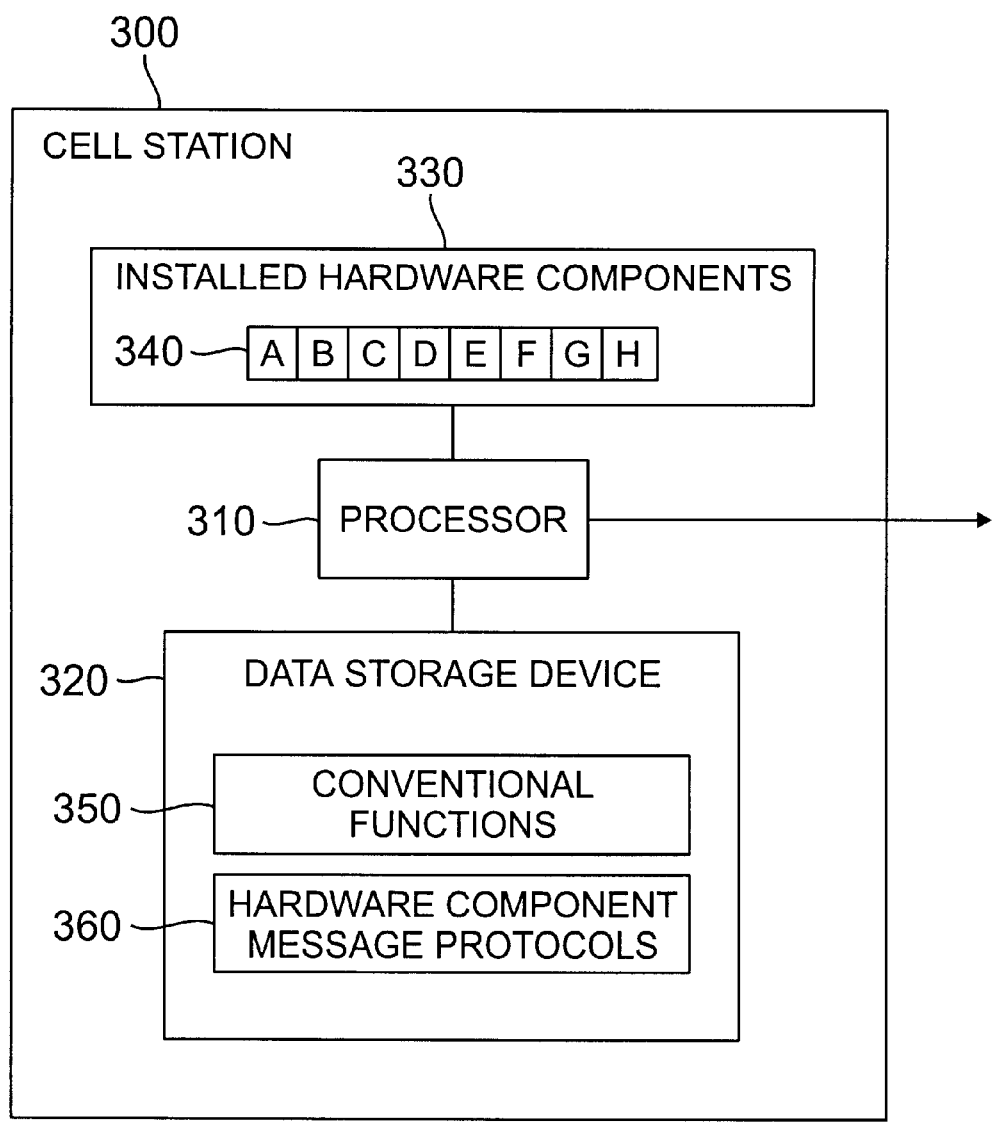
FIG. 3 is a schematic block diagram illustrating a cell station of FIG. 1, in accordance with the present invention.

FIG. 2 is a block diagram showing the architecture of an illustrative central control station 200. The central control station 200 preferably includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute.

The data storage device 220 preferably includes the code to perform supervisory and control functions 230, switching functions 240 and other conventional functions 250. For a detailed description of conventional functions of a central control station 200, see, for example, U.S. Pat. No. 4,829,554, incorporated by reference above. In addition, the data storage device 220 includes a response analysis database 400, discussed further below in conjunction with FIG. 4, and the system configuration process 500, discussed further below in conjunction with FIG. 5. Generally, the response analysis database 400 is a knowledge base identifying potential hardware component(s) for each type of response received from the cell station 300, following one or more of the iterations of the system configuration process 500.

It is noted that the functionality provided by the central control station 200, such as communicating with a remote cell station 300 to progressively refine the system configuration information, could be provided directly by the cell station 300 itself or by a separate configuration controller (not shown), as would be apparent to a person of ordinary skill in the art. FIG. 3 is a block diagram showing the architecture of an illustrative cell station 300. The cell station 300 preferably includes a processor 310 and related memory, such as a data storage device 320. Each of these components 310, 320 may function identically to those corresponding components described above in conjunction with FIG. 2. The data storage device 320 includes conventional functions 350 for communicating with cellular telephones 130 and the central control station 200. For a detailed description of conventional functions of a cell station 300, see, for example, U.S. Pat. No. 4,829,554, incorporated by reference above. In addition, the data storage device 320 includes conventional hardware component message protocols 360 for communicating with the hardware components 340A–340H installed, for example, on a rack 330 on the cell station 300.

As previously indicated, the cell station 300 may be embodied as a conventional cell station, such as the cell station described, for example, in U.S. Pat. No. 4,829,554, incorporated by reference herein. In this manner, the cell station 300 operates normally, forwarding the messages that are received from the central control station 200 to the hardware components, as required. Alternatively, the remote cell station 300 can be modified to progressively refine its own system configuration information, in accordance with the present invention, as would be apparent to a person of ordinary skill in the art.

As previously indicated, the response analysis database 400, shown in FIG. 4, is a knowledge base identifying potential hardware component(s) for each type of response received from the cell station 300, following one or more of the iterations of the system configuration process 500. The response analysis database 400 maintains a plurality of records, such as records 405–420, each corresponding to a different potential response which might be received back from the hardware components 340A–340H in response to various default messages, such as a version query or subsequent iterative queries. For each potential response to a given message sent to a particular assumed hardware type, identified in fields 425 through 435, respectively, the response analysis database 400 includes the corresponding potential hardware components 340A–340H that may have issued such a response in field 440. In accordance with the present invention, the system configuration process 500, shown in FIG. 5, progressively refines the system configuration information, including the type and version of hardware component filling each slot 340A–340H (FIG. 3) on a given cell station 300. As shown in FIG. 5, the system configuration process 500 initially assumes a system configuration having each of the slots 340A–340H installed with a default hardware component during step 510. The current system configuration is then transmitted to the cell station 300 during step 520, with an instruction for the cell station 300 to communicate with each of the hardware components utilizing the message protocol associated with the current assumed configuration for the device. In one embodiment, the cell station 300 queries each hardware component for its associated type and version during step 520. The cell station 300 communicates with the installed hardware components 340A–340H using a conventional message protocol associated with the default hardware component.

The responses from the actual installed hardware components are collected by the cell station 300 and returned to the central control station 200. The central control station 200 receives the responses during step 530. The returned responses provide information that can be used by the central control station 200 to help ascertain the type and version of the hardware component actually installed. For example, certain error responses may indicate an alternate guess for the installed hardware components. In addition, a failure to respond may indicate that no hardware is present at a given location or may further suggest an alternate guess for the installed hardware components. In addition, other responses provide information that help to refine the assumed system configuration.

Thus, based on the received responses, failures to respond and the knowledge base stored in the response analysis database 400, the system configuration process 500 refines the current assumed system configuration during step 540. A test is then performed during step 550 to determine if another iteration should be performed to further refine the system configuration. If it is determined during step 550 that another iteration should be performed to further refine the system configuration, then program control returns to step 520 and continues in the manner described above. If, however, it is determined during step 550 that another iteration should not be performed to further refine the system configuration, for example, if a predefined maximum number of iterations has been attempted, then program control terminates during step 560.

It is to be understood that the embodiments and variations shown and described herein are merely illustrative of the principles of this invention and that various modifications may be implemented by those skilled in the art without departing from the scope and spirit of the invention.

I claim:

1. A method for determining configuration information for remote equipment, said remote equipment having a plurality of installed hardware components, said method comprising the steps of:
   assuming a system configuration for said remote equipment, said system configuration consisting of each of said installed hardware components embodied as a default hardware component device;
   transmitting a message to said installed hardware components using a message protocol appropriate for a current assumed system configuration;
   receiving responses from said installed hardware components, including at least one error message caused by using an improper message protocol for one of said installed hardware components;
   refining said assumed system configuration based on said received responses, including said at least one error message; and
   repeating said transmitting, receiving and refining steps until a final system configuration is determined.

2. The method according to claim 1, wherein said message is transmitted to a processor of said remote equipment and said processor queries said installed equipment for said identifying information.

3. The method according to claim 1, wherein said message consists of a request to provide type and version information.

4. The method according to claim 1, wherein said remote equipment is a cell station.

5. The method according to claim 1, wherein said method is performed by a central configuration controller.

6. The method according to claim 1, wherein said refining step accesses a knowledge base of potential hardware component(s) for each possible received response.

7. A method for determining the configuration of installed hardware components, said method comprising the steps of:
   obtaining an assumed system configuration for said installed hardware components, said assumed system configuration consisting of each of said installed hardware components embodied as a default hardware component device;
   communicating with said installed hardware components using a message protocol appropriate for said assumed system configuration;
   receiving responses from said installed hardware components, including at least one error message caused by using an improper message protocol for one of said installed hardware components;
   refining said assumed system configuration based on said received responses, including said at least one error message; and
   repeating said receiving and refining steps until a final system configuration is determined.

8. The method according to claim 7, wherein said communication consists of a request to provide type and version information.

9. The method according to claim 7, wherein said method is performed by a cell station.

10. The method according to claim 7, wherein said refining step accesses a knowledge base of potential hardware component(s) for each possible response to the communication.

11. A central control station interconnected with remote equipment in a communication network, said remote equipment having a plurality of installed hardware components, comprising:
    a processor to assume a system configuration for said remote equipment, said system configuration consisting of each of said installed hardware components embodied as a default hardware component device;
    an output for transmitting a message to said installed hardware components using a message protocol appropriate for said assumed system configuration;
    an input for receiving responses from said installed hardware components, including at least one error message caused by using an improper message protocol for one of said installed hardware components; and
    a processor to iteratively refine said assumed system configuration based on said received responses including said at least one error message and repeat said transmission of said message and said receiving of responses until a final system configuration is determined.

12. The central control station according to claim 11, wherein said message is transmitted to a processor on said remote equipment and said processor queries said installed equipment for identifying information.

13. The central control station according to claim 11, wherein said message consists of a request to provide type and version information.

14. The central control station according to claim 11, wherein said remote equipment is a cell station.

15. The central control station according to claim 11, wherein said processor refines said assumed system configuration by accessing a knowledge base of potential hardware component(s) for each possible received response.

16. A self-configuring remote device, said remote device having a plurality of installed hardware components, comprising:
- a processor configured to:
  - (i) assume a system configuration for said installed hardware components, said system configuration consisting of each of said installed hardware components embodied as a default hardware component device;
  - (ii) communicate with said installed hardware components using a message protocol appropriate for said assumed system configuration;
  - (iii) receive responses from said installed hardware components, including at least one error message caused by using an improper message protocol for one of said installed hardware components;
  - (iv) refine said assumed system configuration based on said received responses, including said at least one error message; and
  - (v) repeat said receiving and refining steps until a final system configuration is determined; and
- a memory device for storing a knowledge base of potential hardware component(s) for each possible received response.

17. The remote device according to claim 16, wherein said communication consists of a request to provide type and version information.

18. The remote device according to claim 16, wherein said remote device is embodied as a cell station.

* * * * *